April 27, 1937.  A. F. WELCH  2,078,783

BEARING HOUSING

Filed Aug. 5, 1933

Inventor
Alfred F. Welch
by Harry E. Dunham
His Attorney.

Patented Apr. 27, 1937

2,078,783

UNITED STATES PATENT OFFICE 2,078,783

BEARING HOUSING

Alfred F. Welch, Fort Wayne, Ind., assignor to General Electric Company, a corporation of New York Application August 5, 1933, Serial No. 683,765

9 Claims. (Cl. 308—132)

My invention relates to bearing housings of the type in which a lubricant reservoir is formed in the bearing housing, and also to an arrangement for cushioning the end thrust of a shaft journaled in the bearing housing.

In making bearing housings having a lubricant reservoir formed in the support, it has been the practice to make the housing of a single casting in which a chamber constituting a lubricant reservoir and struts to support the bearing are formed by a core placed in the mold. The use of this core complicates the casting and makes it impracticable to utilize the available space effectively so as to obtain a large capacity oil reservoir.

An object of my invention is to provide a bearing housing which can readily be made of a simple hollow casting in which the lubricant reservoir is formed between an end of the casting and a separate partition placed across the casting. This construction avoids the necessity of using a core when casting the housing and also makes it convenient to provide a large lubricant reservoir.

Another object of my invention is to provide a bearing housing in which a simplified spring arrangement is used to cushion the vibration due to the end play of the shaft, and also in which the spring is used to retain the absorbent material in the bearing housing.

Further objects and advantages of my invention will become apparent as the following description proceeds and the features of novelty which characterize my invention will be pointed out with particularity in the claims annexed to and forming a part of this specification.

Figure 1:
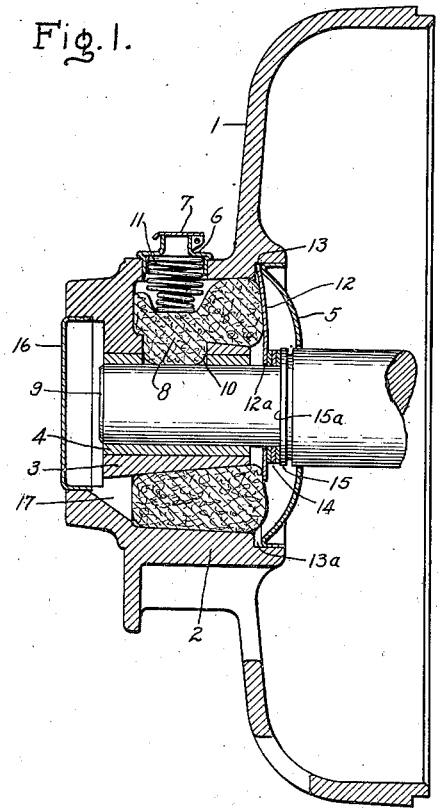
Figure 2:
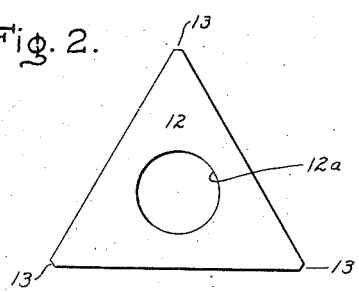

In the accompanying drawing, Fig. 1 is a sectional view of my improved bearing housing, and Fig. 2 is a view of a spring plate member used in the bearing housing.

In Fig. 1, I have shown an end shield 1 of a dynamo-electric machine having an integral bearing housing embodying my invention. The bearing housing is formed by an outwardly flaring wall 2 of the end-shield, and an inwardly tapering reentrant wall 3 spaced from the outer wall and supporting a sleeve bearing 4 pressed into wall 3. The wall 3 is preferably annular and supports the bearing 4 throughout its length, which permits the use of a thin bearing sleeve. The inner and outer walls of the bearing housing are so shaped that they may readily be cast as an integral part of the end-shield without the use of cores. The lubricant reservoir is formed between a plate or closure 5 sealed in an annular recess of the end-shield and the outer wall 2 of the end-shield. This construction provides a simple way for forming a large capacity lubricant reservoir, and by varying the shape of the plate 5 and the position of the recess in which the plate is secured the size of the reservoir may be conveniently varied as desired.

The lubricant reservoir is filled through an oil cup 6 having a hinged cover 7 and secured in a hole drilled in the outer wall of the bearing housing. An annulus of absorbent material 8 is arranged around the bearing support 3 and feeds the lubricant from the reservoir to a shaft 9 through an opening 10 in the bearing support 3 and the bearing 4. A spring 11 mounted in the oil cup 6 retains the absorbent material in the opening 10 and against the shaft 9. A triangular transverse spring plate or member 12, secured in the recess in the bearing housing at the corners 13 by the plate 5, retains the absorbent material in position around the bearing support 3. The triangular plate is arranged so as to retain the absorbent material 8 away from an oil slinger 15 adjacent a shoulder 15a on the shaft which are within the closure 5. The openings between the spring plate and the wall of the bearing housing permit the oil thrown outwardly by the oil slinger to drain into the portion of the oil reservoir in which the absorbent material is located. This spring plate is provided with a central opening 12a providing running clearance about the shaft 9. The spring plate 12 may be made of any desired shape, but I prefer to shape the plate so that it surrounds the shaft 9 and can be symmetrically supported at its outer edges.

In assembling this construction the annulus 8 of absorbent material is placed about the bearing support, the spring plate 12 is arranged in the annular recess 13a in the end shield, and the closure plate 5 is pressed into this recess to secure the spring plate therein.

The spring plate 12 acting through washers 14 placed between the plate 12 and a shoulder on the shaft 9 biases the shaft away from the bearing support. By this construction the spring plate is used to cushion the endwise or axial movement of the shaft 9 and to prevent the bumping of the shaft against the bearing support. Since the spring plate 12 is in frictional contact with the absorbent material, the friction between the spring plate and the absorbent material exerts a damping effect on the axial movement of the spring plate and the shaft which tends to decrease the amplitude of any endwise oscillation of the shaft. By supporting the spring plate from the outer wall of the bearing housing or from any point outside the bearing, the spring plate acts as a transverse spring of convenient dimensions. This feature is important since the device for cushioning the axial movement of the shaft due to end play fits into a limited space. By utilizing a spring plate to cushion the end play of the shaft, any desired cushioning action may readily be obtained, and these plates can readily and uniformly be made to produce any desired cushioning action.

An end cap 16 is used to close the other end of the bearing housing and to provide an auxiliary chamber into which oil thrown from the end of the shaft may be collected. This oil is drained to the main lubricant reservoir through an opening 17 between the inner and outer walls of the bearing housing. Other similar openings are provided so that the oil will be drained from the auxiliary chamber regardless of the position in which the motor is mounted.

While I have shown and described my invention in connection with an end-shield for a dynamo-electric machine, it will be understood that it is applicable to other types of bearing housings.

What I claim as new and desire to secure by Letters Patent of the United States is:

1. A hollow end-shield for dynamo-electric machines having a flaring outer wall, a reentrant bearing attached to said wall and extending in spaced relation thereto, means including an absorbent material arranged about said bearing for feeding lubricant thereto, and means including a resilient end play cushioning device axially spaced from said bearing for retaining said absorbent material about said bearing.

2. A bearing housing having a lubricant reservoir, a bearing supported in said housing, absorbent material for feeding lubricant from said reservoir to said bearing, and a resilient member arranged in spaced relation to said bearing and in contact with said absorbent material to retain said absorbent material in position and to cushion the axial movement of a shaft arranged in said bearing.

3. A hollow bearing housing having a flaring outer wall, a bearing support comprising a reentrant inwardly tapering inner wall of said housing, a plate closing said housing and forming a lubricant reservoir between said plate and said outer wall, a bearing mounted in said support, absorbent material in said reservoir for feeding lubricant from said reservoir to said bearing, and means including a resilient member attached to said housing in axially spaced relation to said reentrant wall and said bearing and retaining said absorbent material in said reservoir for cushioning and damping the axial movement of a shaft arranged in said bearing.

4. In combination with a shaft, a bearing housing comprising a bearing and a wall extending outwardly from said bearing, a transverse resilient plate axially spaced from said bearing and frictionally supported by said wall on opposite sides of said bearing and having an opening to receive said shaft, and means formed on said shaft and arranged to cooperate with said resilient plate for cushioning axial movement of said shaft.

5. A bearing housing having a lubricant reservoir, a bearing supported in said housing, means including absorbent material for feeding lubricant from said reservoir to said bearing, means communicating with said reservoir for supplying lubricant thereto, means arranged in said lubricant supply means for resiliently urging said absorbent material into contact with said bearing, and means including a resilient plate axially spaced from said bearing and in frictional contact with said absorbent material for cushioning and damping the axial movement of a shaft arranged in said bearing.

6. A bearing housing having a lubricant reservoir, a bearing supported within said reservoir in said housing, means including absorbent material for feeding lubricant from said reservoir to said bearing, and means including a transverse resilient member axially spaced from said bearing and in frictional contact with said absorbent material for cushioning and damping the axial movement of a shaft arranged in said bearing.

7. A bearing housing having a lubricant reservoir, a bearing supported within said reservoir in said housing, means including absorbent material for feeding lubricant from said reservoir to said bearing, and means including a spring plate axially spaced from said bearing and surrounding said shaft and in frictional contact with said absorbent material for cushioning and damping the axial movement of a shaft arranged in said bearing.

8. An end shield for dynamo-electric machines or the like having an outer wall, a bearing support formed on said outer wall, a bearing mounted in said bearing support and extending in spaced relation inwardly from said outer wall, means including an absorbent material arranged in the recess formed by said bearing and said outer wall for feeding lubricant to said bearing, and means including a resilient end play cushioning device spaced from said bearing for retaining said bearing for retaining said absorbent material about said bearing.

9. An end shield for dynamo-electric machines or the like having an outer wall, a bearing support formed on said wall, a bearing mounted in said bearing support and extending in spaced relation inwardly from said wall, a plate arranged to provide a closure for the recess formed by said bearing and said outer wall to form a lubricant reservoir, means including an absorbent material arranged in said recess for feeding lubricant to said bearing, and means including a resilient member mounted on said end shield between said outer wall and said plate and spaced from said bearing for retaining said absorbent material about said bearing and for cushioning the axial movement of a shaft arranged in said bearing.

ALFRED F. WELCH.

CERTIFICATE OF CORRECTION.

Patent No. 2,078,783.                                                              April 27, 1937.

ALFRED F. WELCH.

It is hereby certified that error appears in the printed specification of the above numbered patent requiring correction as follows: Page 2, second column, line 48, claim 8, strike out the words "said bearing for retaining"; and that the said Letters Patent should be read with this correction therein that the same may conform to the record of the case in the Patent Office.

Signed and sealed this 1st day of June, A. D. 1937.

(Seal)                                                     Henry Van Arsdale
                                                        Acting Commissioner of Patents.